Figure 1:
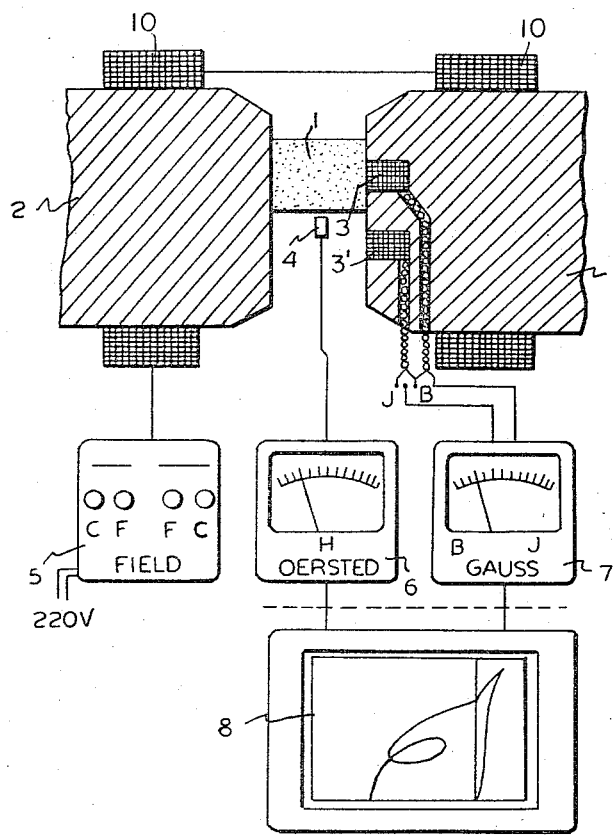

United States Patent Office 3,365,660
Patented Jan. 23, 1968

3,365,660
MAGNETIC TESTING DEVICE UTILIZING MAG-
NETIZING MEANS WHICH CLAMPS THE TEST
PIECE AND CONTAINS IMBEDDED SENSORS
Erich A. Steingroever, 33 Flensburger Strasse,
Bonn, Germany
Continuation-in-part of application Ser. No. 193,462,
May 9, 1962. This application May 3, 1966, Ser.
No. 562,985
5 Claims. (Cl. 324—34)

This application is a continuation-in-part of my application Ser. No. 193,462, now abandoned, for a "Device For Measuring The Demagnetization Curve Of Permanent Magnets," filed May 9, 1962.

This invention relates to apparatus for determining the magnetic properties of a test piece.

Many years ago, I disclosed in German Patent No. 871,185 an apparatus to measure the B–H characteristics of a material which comprised movable pole pieces to clamp the material in a test position, variable energization of the pole pieces to produce a magnetic field between the pieces, and B sensing means located adjacent the test pieces and imbedded in one of the pole pieces. In that and similar constructions, it was considered axiometric to measure H only by placing a rotating H sensing coil in the air gap between the pole pieces.

I have now found that considerable advantages can be obtained by placing an H measuring means as a stationary sensing coil in the pole piece itself. Such arrangement improves the accuracy of the measurement of the intensity of the magnetization and protects the element against injury. As a particular advantage, the pole piece with imbedded B and H measuring elements constitutes a replaceable integral unit which is easy to manipulate and prevents any mistakes.

In accordance with the invention, the pick-up coil for the magnetic induction B as well as the pick-up coil for the magnetic field strength H are inserted into the front face of the same pole piece whereby both coils have the same turns-area value and the B measuring coil is arranged in contact with the test piece while the H measuring coil is placed outside the area where test piece and pole piece are in contact but in closely spaced relation thereto so as to measure the strength of the magnetic field immediately surrounding the test piece without receiving the B lines. Both coils are connected in series-opposition to an integrating fluxmeter so as to indicate thereon the value $B-H=J$.

Figure 2:
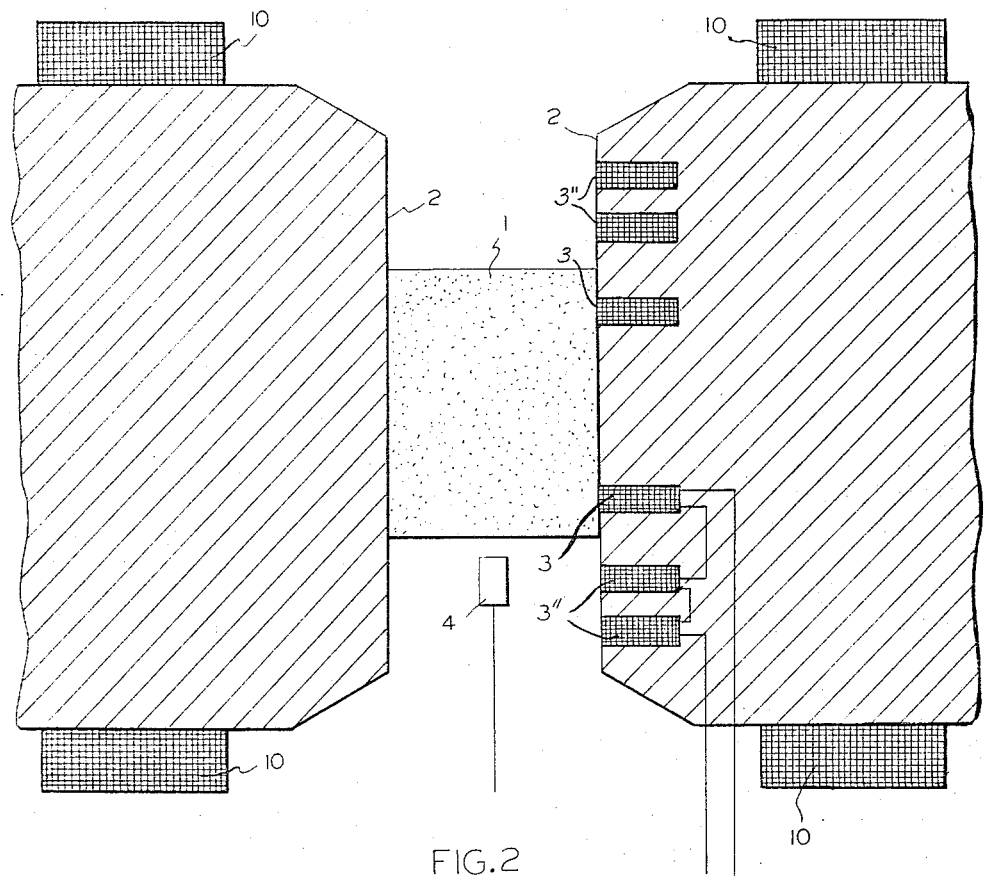

The invention will be readily understood by reference to the following description in conjunction with the accompanying drawing illustrating, by way of example, two embodiments of the invention. In the drawings:

FIG. 1 is a measuring apparatus in accordance with the invention with the pick-up coils side by side, and FIG. 2 shows a modified arrangement of the magnet and pick-up coils of the apparatus of FIG. 1.

Referring to the drawings, it will be seen that the apparatus comprises a yoke with two pole pieces 2 defining therebetween an air gap and clamping in said air gap the magnetic test piece 1. One or both pole pieces are movable in axial direction to provide for clamping engagement with the test piece.

Coils 10 energize the pole pieces to produce magnetic fields of varying strength H across the air gap. A coil 3 firmly inserted in the front face of one of the pole pieces adjoining the test piece measures B, and an identical coil 3' for the measurement of H is similarly inserted in the same front face, not in contact with the test piece but confronting the air gap immediately surrounding the test piece. The longitudinal axes of the coils 3, 3' are parallel with the common longitudinal, or symmetry, axis of the poles and are spaced apart a distance greater than the sum of the radii of the two coils. By means of switch means JB the two pick-up coils are connected in series-opposing relation and in series with a fluxmeter 7 which will indicate the intensity of magnetization in gauss.

Measuring means 4, e.g., means measuring the Hall effect, are placed in the magnetic field in the air gap between the pole piece and indicate the field strength H on the meter 6 in oersted.

A regulator 5 allows coarse and fine adjustment of the energizing current in coils 10 either in the positive or negative direction. A coordination recorder 8 connected to the meters 6 and 7 integrates the recordings to the two meters and plots the hysteresis curve.

In a practical test of an exchangeable pole piece 2 with integral pick-up coils, the coils were wound on iron cores of approximately 6 mm. diameter. The coils and cores were firmly mounted in bores of about 7 mm. diameter and caused only a very small disturbance of the magnetic flux in the test piece.

The arrangement as shown in FIG. 1 is useful for all measurements of relatively large test pieces which may laterally project outside the pole pieces into the area not contacted by the test piece, i.e., for instance, upwardly when considering FIG. 1.

The embodiment of the invention shown in FIG. 2, has the advantage of providing for completely homogeneous magnetization of the test piece but can be used only for test pieces which can be placed in the center of the pole pieces. In this embodiment, an annular pick-up coil 3″ for H is in the form of a circle, concentrically arranged around the pick-up coil 3 for B again in such a way that coil 3 abuts the test piece and coil 3″ faces the air space around the test piece. The coil 3″ is constituted by an inner and an outer ring, whereby the coiled section of these rings are connected in series and in opposition with one another and act as one single coil connected in opposition to coil 13. In such arrangement, it is only the outer coil area which measures the magnetic flux, and the measurement is not influenced by the flux received inside the inner diameter. It is only necessary to ensure that the two pick-up coils 3 and 3″ have the same turns-areas $n_3 \cdot F_3 = n_{3''} \cdot F_{3''}$, n designating the number of turns and F the cross section of the core of the coil.

I claim:

1. A device for determining the magnetic properties of a test piece, comprising a yoke having first and second poles with confronting pole faces defining a gap therebetween, the distance between said poles being adjustable to allow clamping of said test piece between said poles, means magnetizing said poles, a first pick-up coil in the said first pole face abutting said test piece, said first pick-up coil measuring the magnetic inductivity B in said test piece, a second pick-up coil received in said first pole face in an area not abutting said test piece, said second pick-up coil having the same turns-area value as said first coil and measuring the field strength H across said air gap, an integrating fluxmeter, said pick-up coils connected in series opposing relation with each other and in series with said fluxmeter.

2. The device claimed in claim 1 wherein the longitudinal axes of said pick-up coils extend parallel to the symmetry axis of said pole faces, said axes having a distance from each other greater than the sum of the radii of the coils.

3. The device claimed in claim 1 wherein said pick-up coils are of annular shape and said second pick-up coil encloses said first pick-up coil concentrically.

4. The device claimed in claim 3 wherein said second pick-up coil is comprised of two coils wound as concentric rings and connected in series opposition with each other.

5. The device claimed in claim 1 further comprising switch means connecting said fluxmeter alternatively to both said pick-up coils together and to said first pick-up coil only.

References Cited

UNITED STATES PATENTS 2,942,177  6/1960  Neumann et al. _____ 324—45

FOREIGN PATENTS 871,185  3/1953  Germany.

OTHER REFERENCES

Crittenden, Jr., E. C., "B–H Meter for Samples of Small Cross-Sectional Area." The Review of Scientific Instruments, vol. 17, No. 10, October 1946, copy in 324–40.

RUDOLPH V. ROLINEC, *Primary Examiner.*

WALTER L. CARLSON, *Examiner.*

R. J. CORCORAN, *Assistant Examiner.*